(12) United States Patent
Fiske

(10) Patent No.: US 6,324,692 B1
(45) Date of Patent: Nov. 27, 2001

(54) UPGRADE OF A PROGRAM

(75) Inventor: Robert Fiske, Wayland, MA (US)

(73) Assignee: Data General Corporation, Westborough, MA (US)

( * ) Notice: Subject to any disclaimer, the term of this patent is extended or adjusted under 35 U.S.C. 154(b) by 0 days.

(21) Appl. No.: 09/362,400

(22) Filed: Jul. 28, 1999

(51) Int. Cl.[7] .................................................. G06F 9/445
(52) U.S. Cl. ........................................ 717/11; 713/2
(58) Field of Search ................................ 717/11; 713/1, 713/2, 100; 714/1, 2, 6, 14; 707/200, 201, 202, 203

(56) References Cited

U.S. PATENT DOCUMENTS

| | | | |
|---|---|---|---|
| 5,379,429 | * | 1/1995 | Hirasawa et al. ............... 717/11 |
| 5,450,589 | * | 9/1995 | Maebayashi et al. ............ 717/11 |
| 5,469,573 | * | 11/1995 | McGill, III et al. ............ 717/11 |
| 5,537,596 | * | 7/1996 | Yu et al. ........................ 717/11 |
| 5,600,784 | * | 2/1997 | Bissett et al. .................. 714/12 |
| 5,664,195 | * | 9/1997 | Chatterji ......................... 717/11 |
| 5,694,600 | * | 12/1997 | Khenson et al. ................ 713/2 |
| 5,720,026 | * | 2/1998 | Uemura et al. ................. 714/6 |
| 5,905,888 | * | 5/1999 | Jones et al. .................... 711/1 |
| 6,021,414 | * | 2/2000 | Fuller ............................ 707/202 |
| 6,044,461 | * | 3/2000 | Agha et al. ..................... 713/1 |
| 6,070,012 | * | 5/2000 | Eitner et al. ................... 717/11 |
| 6,167,567 | * | 12/2000 | Chiles et al. ................... 717/11 |
| 6,247,141 | * | 6/2001 | Holmberg ....................... 714/2 |

OTHER PUBLICATIONS

No author, "Digital Prioris XL Server 5166DP", Computer Reseller News, Jun. 10, 1996, pp. 131.*

* cited by examiner

Primary Examiner—Kakali Chaki
(74) Attorney, Agent, or Firm—Bromberg & Sunstein LLP

(57) ABSTRACT

A method and processor program product for performing an upgrade of a program on a processor are provided. An upgraded version of the program is received into the processor and a backup of the program is created in memory associated with the processor. The upgraded version of the program is then installed and the processor is rebooted. Prior to initializing other application drivers, a reboot driver checks if the state of the processor is correct. If the reboot driver determines that the state of the processor is incorrect, the system reverts to the backup of the program. In alternative embodiments, if the reboot driver determines that the state is incorrect, the system inhibits the loading of other application drivers. Additionally, the reboot driver may set a counter to indicate the number of times that the processor is rebooted. If the counter has not reached a predetermined threshold, the system attempts to reboot the processor with the upgraded version of the program. If the counter reaches the predetermined threshold, the system reverts to the backup of the program.

30 Claims, 4 Drawing Sheets

UPGRADE OF A PROGRAM

FIELD OF INVENTION

This invention relates to computer programs, and more particularly to program upgrades.

BACKGROUND ART

Installing an upgrade of a computer program on a personal computer generally requires a user to load a compressed version of the program onto the computer and begin an installation process. The installation process normally requires a user to execute an installation program and additionally respond to prompts for information as required by the installation program. The installation process may directly overwrite the previous version of software or the process may uninstall the current version of the software prior to installing the new version. Once the software is installed the system is typically rebooted and an attempt can be made to run the software. If the software fails to install, the user must decide whether to reinstall the upgraded program or to reinstall the previous version that was compatible with the system.

In a networked system, which is connected to a central server with attached disk arrays, an upgrade to a centrally accessed program on the server is performed in a substantially similar fashion, where the upgrade requires that the system administrator load the upgrade, install the program, and reboot the server. The system must be shut down for a period of time during installation and the rebooting of the server. This shutdown makes access to both files and programs on or connected to the server impossible during rebooting. Additionally, if the upgrade fails to install, the system administrator must decide whether to reinstall the upgrade or the current version of the program. Both operations again take the server offline and deny users access to files and programs.

In a system which has redundant servers, upgrading a program posses a further problem. In order for the redundant servers to operate properly, the program mirrored on the inactive server must be compatible with the upgraded program on the active server. Potential inconsistencies may occur when the active server is upgraded with a new version of a program and the format of data transfer between the two servers changes. In such a circumstance redundancy is lost between the servers. Also if an upgraded active server goes off line and the inactive server becomes active the inactive server may not be capable of interpreting the new message protocols that were part of the upgraded server program.

SUMMARY OF THE INVENTION

The present invention is directed to a method and processor program product for performing an upgrade of a program on a processor. An upgraded version of the program is received into the processor and a backup of the program is created in memory associated with the processor. The upgraded version of the program is then installed and the processor is rebooted. Prior to initializing other application drivers, a reboot driver checks if the state of the processor is correct. If the reboot driver determines that the state of the processor is incorrect, the system reverts to the backup of the program. In alternative embodiments, if the reboot driver determines that the state is incorrect, the system inhibits the loading of other application drivers. Additionally, the reboot driver may set a counter to indicate the number of times that the processor is rebooted. If the counter has not reached a predetermined threshold, the system attempts to reboot the processor with the upgraded version of the program. The counter may be stored in a database, such as, the registry of the processor. If the counter reaches the predetermined threshold, the system reverts to the backup of the program.

In another related embodiment, the processor is a first server in a server cluster. The first server communicates to a second server that an upgrade is to occur in the first server. The first server confirms that second server is running a program which is compatible with the upgraded program prior to beginning the installation of the upgraded program. If the second server is not running a compatible version of the program, the second server sends a signal to the first server to abort the upgrade. If the second server is running a compatible program, the second server sends a signal prior to the first server to begin installation of the upgrade indicating that the second server will receive input and output formerly associated with the first server. When installation of the upgrade is complete, the first server notifies the second server that the first server is in the process of rebooting and then confirms that the program has been upgraded. Once the first server has been upgraded, the entire process may be performed again so that the second server may be upgraded. In another embodiment, the installation of the upgrade is performed automatically without human intervention.

BRIEF DESCRIPTION OF THE DRAWINGS

The foregoing features of the invention will be more readily understood by reference to the following detailed description taken with the accompanying drawings.

DETAILED DESCRIPTION OF SPECIFIC EMBODIMENTS

Figure 1:
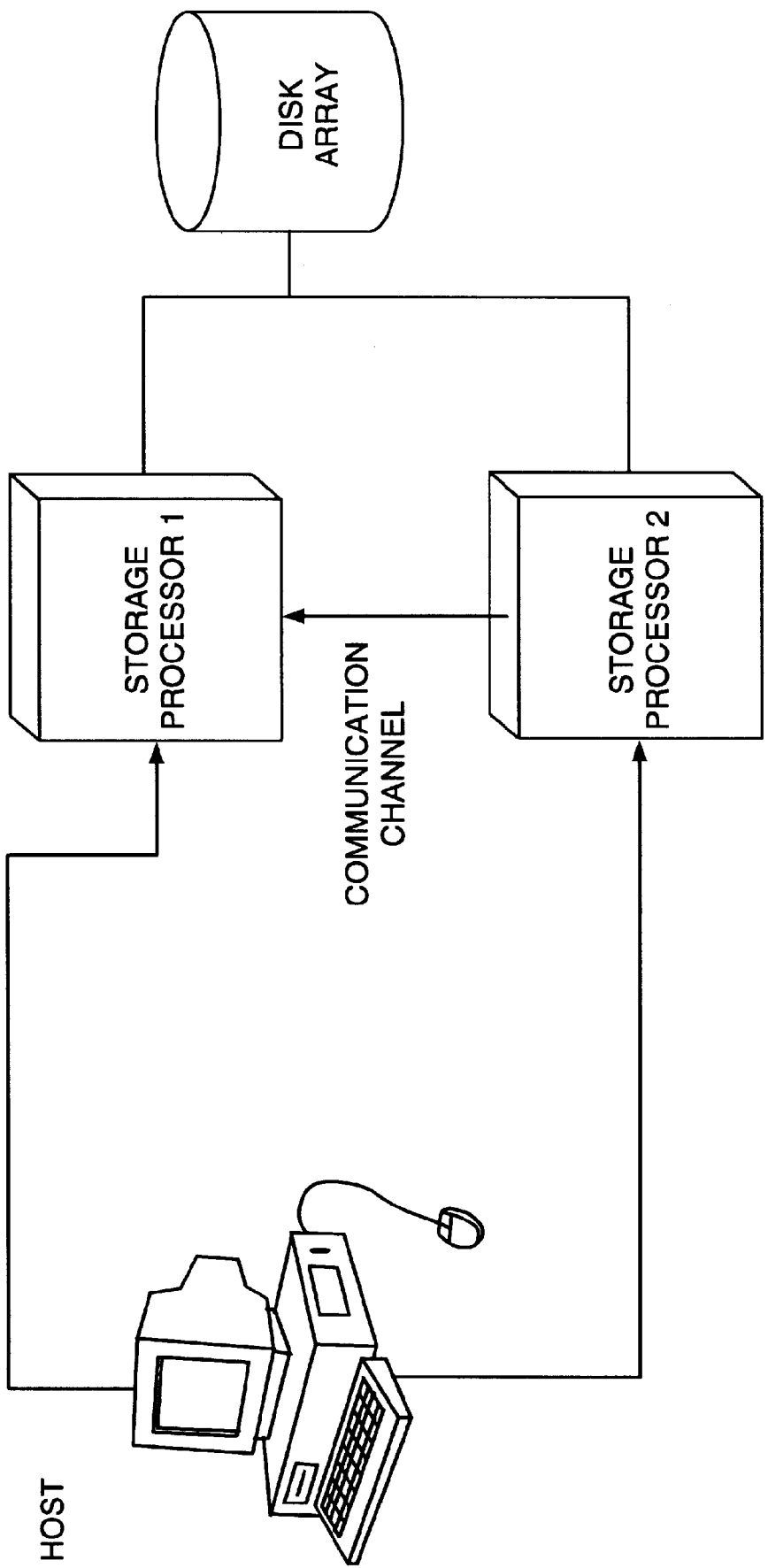
FIG. 1 is a preferred embodiment of the present invention for upgrading a program.

The term "driver" as used within the following descriptions and claims shall mean a program that runs in the operating system context/space. FIG. 1 shows the system for nondisruptive upgrade of a headless system in accordance with a preferred embodiment of the invention. In this system a remote host is in communication with a server cluster which is coupled to a disk array. A server cluster is a group of two or more processors coupled to share data and to provide a redundant backup in case one server fails. In this system storage processor 1 and storage processor 2 provide parallel processing. The host is connected to each of the processors and both processor 1 and processor 2 may access any of the attached disks within the disk array. The host sends requests such as read commands or write commands to a particular disk through a preferred processor. A preferred processor is associated with specified LUNs (logical unit numbers) for a group of disks. The second processor provides an alternative path of access to the LUNs associated with the preferred processor in case of failure of the preferred processor or if the system is being upgraded. In this configuration all of the data stored on the disks is associated with a preferred path through the preferred processor and a failover path through the second processor.

In the system of FIG. 1, storage processor 2 is connected to storage processor 1 by means of a fiber channel. Each of the processors mirrors the cache of the other processor so that the caches are identical. In the event of storage processor 1 failing, the cache of storage processor 1 is dumped to a reserved section of one of the disks in the disk array and then the data is redistributed to the appropriate memory address associated with the data. Once the host stops receiving data communication signals from processor 1, the host assumes that there has been an error and begins automatic failover procedures. The host switches to the failover path and begins routing all requests through storage processor 2. The host will occasionally poll the failed server to determine if the server was shut down temporarily as in the case of a system upgrade or a power failure. A failover switching system is described in U.S. Pat. No. 5,922,077 entitled FAIL-OVER SWITCHING SYSTEM filed on Nov. 14, 1996 assigned to the same assignee and which is incorporated by reference herein in its entirety.

Upgrading one of the processors in the server cluster without interruption of service is possible, if the host has automatic transaction failover software installed and the host is connected to each processor as described above. If the automatic transaction failover software is not installed then the processor which fails is inaccessible while it is being upgraded. In a server cluster downtime is reduced by turning control over to another server during the upgrade process through automatic transaction failover.

Figure 2:
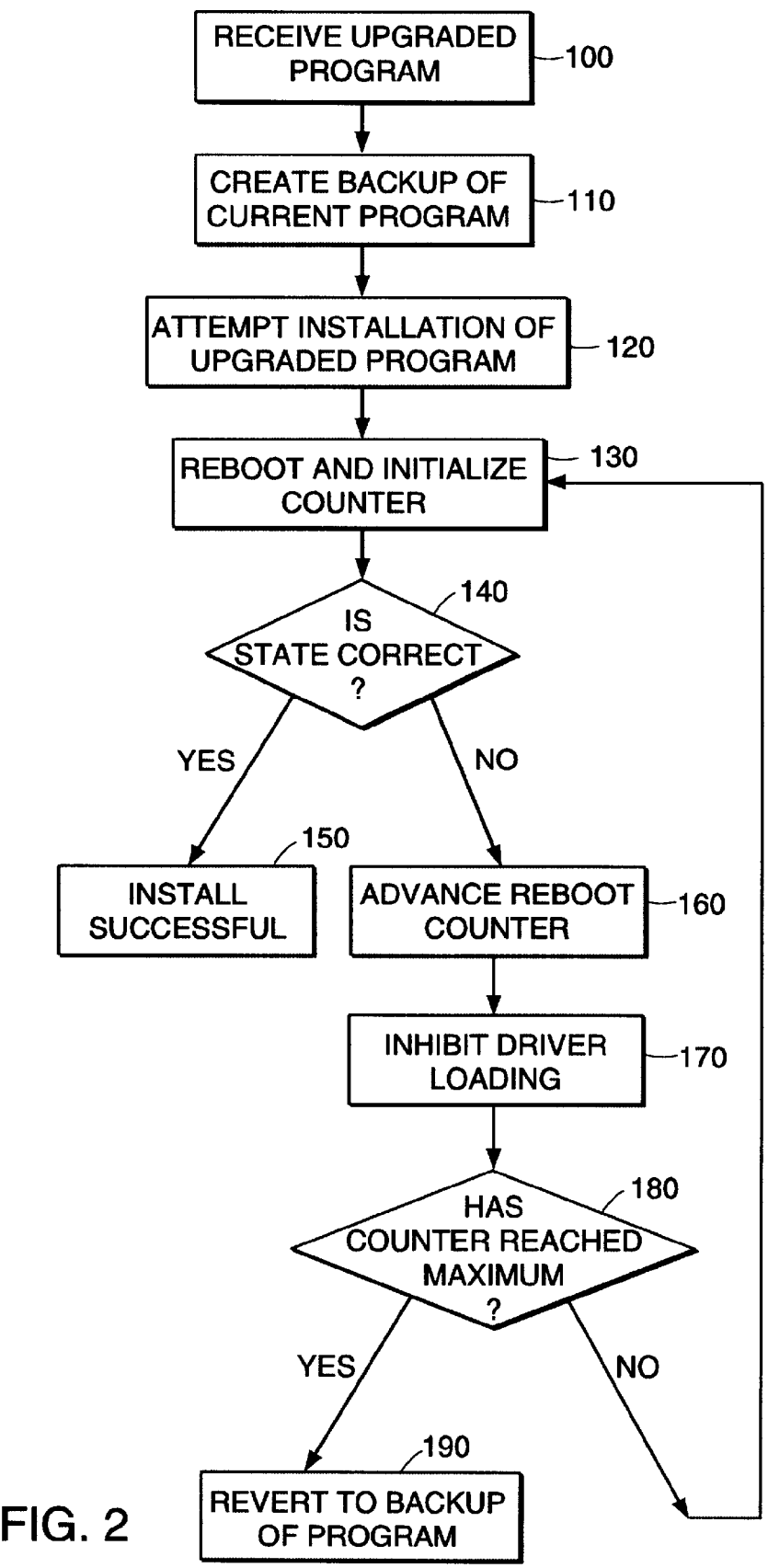
FIG. 2 is a flow chart showing the method for installing a nondisruptive upgrade.

FIG. 2 is a flow chart of the sequence of steps taken in automatically upgrading a software program on a processor so that the processor is controlled as state machine. Although the term processor is used, the method may be performed on a computer. Further, the method may be performed on any processor including a headless processor as the method provides for automatic upgrading. A headless processor lacks a user input device and is normally devoid of a keyboard and monitor. In step 100 an upgrade of a program already on the processor is input into the processor. The upgraded program may be transmitted from a remote location through a network connection such as the host computer shown in FIG. 1 or may be placed on the processor through some other transportable medium such as a floppy disk or a CD-ROM. If the upgrade is transmitted remotely either via a network or Internet connection, a graphical user interface (GUI) may be present on the remote machine for establishing a connection to the processor, transmitting the upgraded software, and overseeing the installation process. On the processor, a procedure may be running which is triggered every time that new data is received by the processor and checks to see if an executable file is present. The processor then unpacks the upgrade materials which may involve decompression of the files and the processor performs consistency checks on the files. Consistency checks are performed to establish the compatibility of the revision and also to verify that the files are authorized upgrades.

The processor recognizes that a new program is available for installation and confirms with the registry of the system that a previous version is currently running on the processor. Once the upgrade has been recognized the current version of the program is copied into another directory on the processor (step 110). This step may occur prior to the initiation of the installation of the upgraded program. Additionally the upgraded version is also copied into it's own directory. The program is then installed by executing the installation program which is either part of the upgrade or a standard program which is resident in the operating system or other software present on the processor (step 120). The program may be saved in compressed form and a monitor program will initiate the installation process. Additionally, the monitor program will have saved the configuration data that is required by the installation program in non-volatile memory. The configuration data may be entered by the monitor program into the blank parameters as the program is being installed or the installation may be controlled remotely through the GUI on the host computer/terminal in which the administrator may enter the configuration data manually. After the program is installed, a script or monitor program running in the application space of the processor causes the processor to be rebooted and a counter to be initialized (step 130). Once the processor is rebooted a reboot driver is triggered (step 140). The reboot driver starts prior to any other application driver on the processor. The reboot driver is an external application driver which is part of the operating system which functions in the operating system space. If the state of the processor as read from the registry of the processor is configured as expected by the reboot driver, a flag is set and the program may be run (step 150). If the registry is not set correctly the reboot driver recognizes the failure and sets the flag to indicate the failure. The counter is then advanced (step 160). In one embodiment the counter is found within the registry. If the flag indicates a failure, the monitor program will inhibit the loading of the remaining application drivers (step 170). The monitor program then checks the counter to see if it has reached a predefined maximum value (step 180). If the counter has reached the maximum the monitor program reverts back to the backup copy of the program which is saved in memory associated with the processor (step 190). The counter is also provided to allow the program to stay at its current revision if a destabilizing power surge causes a reboot before the prior reboot is complete.

By providing a method for backing out to the backup program which is known to work on the processor, the processor will not have lingering downtime. Additionally, if a currently running version of the program becomes corrupted the method allows the backup copy to be reinstalled.

Figure 3:
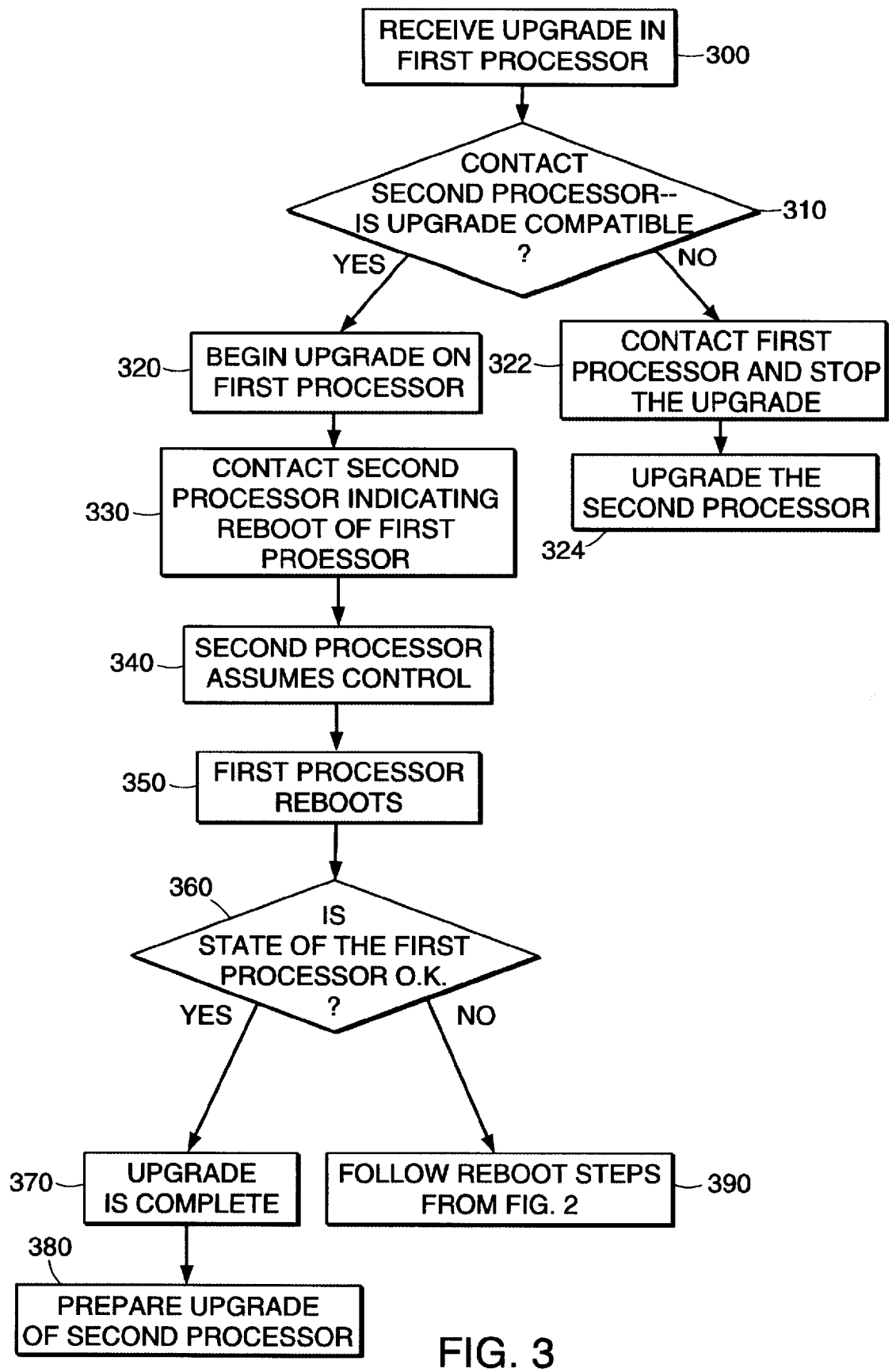
FIG. 3 is a flow chart of the method for installing a nondisruptive upgrade in a preferred embodiment of the system as shown in FIG. 1.

FIG. 3 is a flow chart of the method for installing a nondisruptive upgrade in a preferred embodiment of the system as shown in FIG. 1. In step 300 the upgrade is received in the first processor of the server cluster. The program is recognized as an upgrade of a program already running on the first processor. In step 310, the second processor of the server cluster which is running a version of the currently running program on the first processor is informed that an upgrade is about to occur on the first processor. The first processor sends information relating to the upgrade so that the second processor can confirm that it is running a compatible version of the upgraded software. A compatible revision contains modifications that can be run on one processor while the partner processor is running a prior revision. If the upgrade contains new messages in the protocol, the upgrade may be run in compatibility mode. In compatibility mode, the upgraded program sends only messages which are recognized by the previous version of the software. If there are minor additions to the program the system and method of U.S. patent application entitled Revision Compatibility Between Programs Ser. No. 09/213,073, filed Dec. 16, 1998 to the same assignee may be applied. The full disclosure of said patent application is hereby incorporated by reference herein. To test for compatibility, the manufacturer of the upgrade would need to have a system in place, such that, various revision numbers would be compatible. For example, the first processor may send the revision number of the upgraded program to the second processor. Based on the revision number, processor 2 could compare that number with the revision number of the currently running program on processor 2 to determine if the upgrade is incompatible, compatible, or should be run in compatibility mode.

Once the second processor has confirmed that the first processor is to be upgraded, the data present in the mirrored caches is sent to the reserved section of one of the disks of the disk array and both processors dump their respective caches. After the caches are dumped, the system operates in a non-cached mode to prevent any loss of information in the event that the second processor fails. The data from the caches is then redistributed from the reserved section to the memory address that is associated with the data.

After the cache data is redistributed, the first processor is signaled that it may begin the upgrade process (step 320). The upgrade process begins as described with reference to FIG. 2. After the installation is complete processor 1 will signal to processor 2 that a reboot is about to occur on processor 1 (step 330). Processor 2 then signals the host that any requests for data will be directed through processor 2 (step 340). Once confirmation from the host occurs, processor 2 will signal processor 1 that the reboot may proceed. The first processor then reboots (step 350). The state of the registry is compared to an expected state by the reboot driver (step 360) If the state is as expected, a reboot flag is set and the upgrade is complete (step 370). At this point control of the disk array and receipt of request for information may be restored to processor 1. Additionally, processor 2 is signaled that it may begin the upgrade procedure (step 380). Processor 2 may be set to immediately begin the upgrade procedure upon receipt of this message or processor 2 may be set on a timer and upgraded at a more preferable time. If the state is incorrect, the reboot flag is set, to indicate a failure initiation of all other drivers is prohibited and the processor begins the reboot sequence of step 130 in FIG. 2.

If processor 2 determines that the upgrade is incompatible with the currently operating version of the program on processor 2 it will signal processor 1 and halt the upgrade process (step 322). When processor 1 receives the message it will abort the upgrade process and continue to run the version of the program that is present on the processor. Processor 2 will then be set into an upgrade mode (step 324). Processor 2 will then attempt to upgrade to a version of the program that will be compatible with the upgrade of the program. The method will then return to step 300 wherein each step with reference to processor 2 will now be with respect to processor 1 and vice versa.

The preferred embodiment of the system operates in the Windows NT, operating environment designed by the Microsoft Corporation of Redmond, Wash. The system takes advantage of Windows NT's setup API to install and uninstall drivers, copy, delete and rename files, including compressing and decompressing and adding deleting and changing registry entries. A backup version of Windows NT is maintained in a separate directory structure from the version being upgraded so that at boot time the backup version of the operating system may be selected if the upgraded version fails to load properly.

In the preferred version of the system, a copy of the current version of the program and a previous version of the program are kept in memory associated with each processor and the current version and the previous version of the program are identical on both processors. When an upgrade occurs, the current revision replaces the previous version and the upgraded version becomes the current version. If the current version is not suitable to become the previous version, for example, if the current version is corrupted, the updated version replaces the current version and the previous version is left alone. In the preferred embodiment, the current version of the program and the previous version are copied from memory associated with the processor to the coupled data storage array to provide additional redundancy. Also, the upgrade material are distributed to both processors and the materials are unpacked and checked in a staging directory before upgrading occurs on either processor.

The host may cancel an upgrade request prior to installation which causes the upgrade materials to be removed from the processor and the host may select the version of the program to run, such that the prior revision may be selected as the current version. Any version of the program may be restored by the host from the data storage array. This function is required when a corrupted version of the revision is on the processor.

Figure 4:
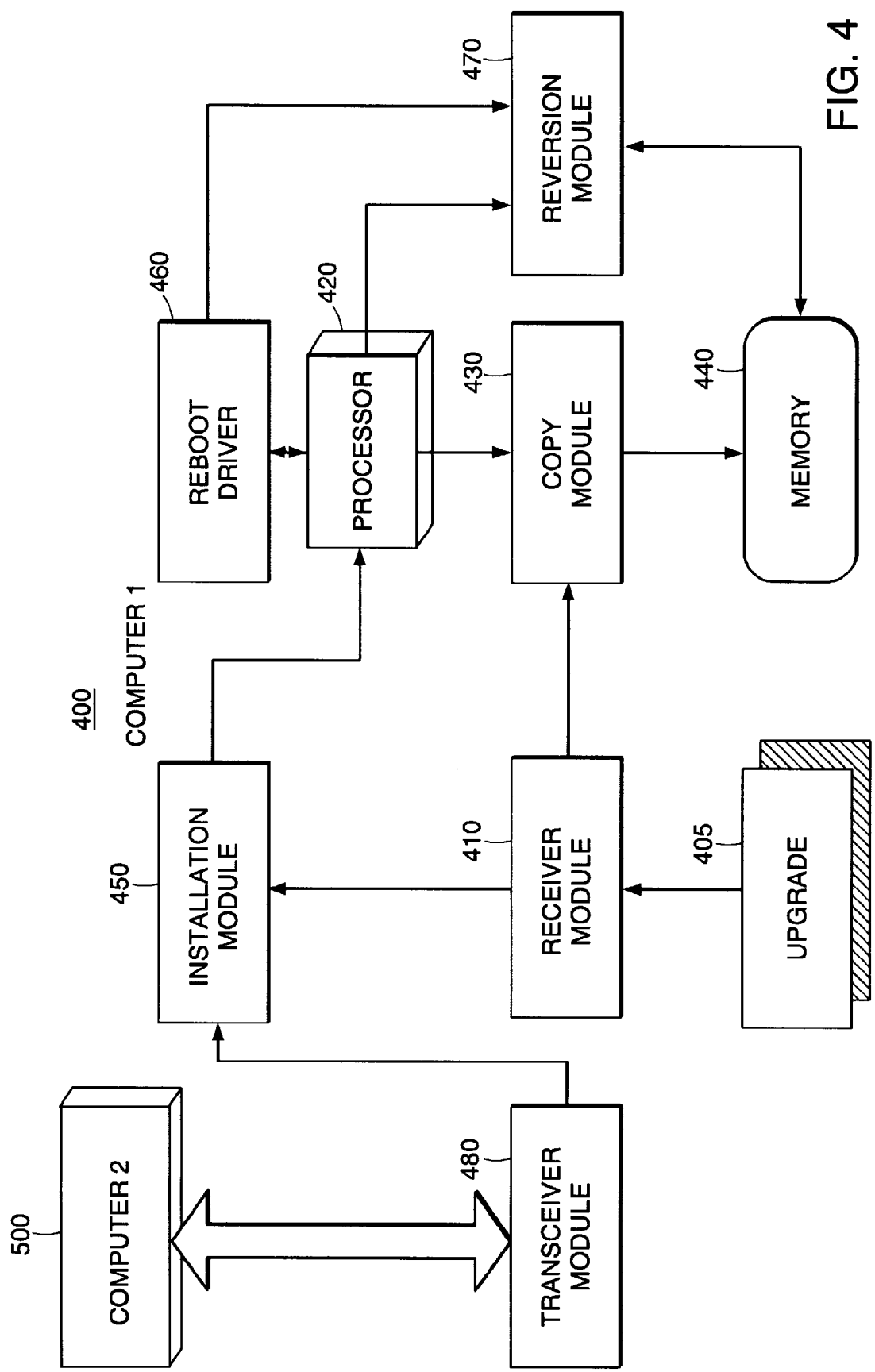
FIG. 4 is a block diagram of one embodiment of the invention represented as modules.

The method as described above may be implemented in various modules as shown in FIG. 4. A receiving module 410 receives the upgrade 405 into the first computer 400 and recognizing that the program is an upgrade of a current program which is resident on the first computer 400 in the processor 420 of the computer. A copy module 430 copies the current program from the processor 420 and stores a backup copy of the current program in memory 440. An installation module 450 installs the upgrade and reboots the first computer 400. A reboot driver 460 reads the processor state of the first computer 400 prior to the initialization of all other application drivers. A reversion module 470 reverts to the backup copy of the current program if the installation of the upgrade fails by recalling the backup copy from memory 440. The backup copy may be a fully executable copy of the program or the backup copy may be compressed. If the backup copy is compressed, the backup copy would be sent to the installation module 450 prior to being executed. In other embodiments in which the upgrade process happens in a server cluster, a transceiver module 480 is included. The transceiver module 480 communicates with a second computer 500 signaling that an upgrade is to occur in the first computer 400 of the server cluster and confirming that the second computer 500 is running a program which is compatible with the upgraded program prior to beginning the installation.

In an alternative embodiment, the disclosed apparatus and method for nondisruptive upgrades may be implemented as a processor program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a processor program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a processor program product) and hardware. Still other embodiments of the invention are implemented as entirely hardware, or entirely software (e.g., a processor program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method of performing an upgrade of a program on a processor, the method comprising:
   receiving an upgraded version of the program into the processor;
   creating a backup of the program in memory associated with the processor;
   installing the upgraded version of the program;
   rebooting the processor with the upgraded version installed;
   checking if the state of the processor is correct by a reboot driver prior to initializing other application drivers.

2. The method according to claim 1, further comprising:
   reverting to the backup of the program if the reboot driver determines that the state of the processor is incorrect.

3. The method according to claim 2, further comprising:
   setting a counter of a reboot driver to indicate the number of times that the processor is rebooted.

4. The method according to claim 3, further comprising:
   attempting to reboot the processor with the upgraded version of the program if the counter has not reached a predetermined threshold.

5. The method according to claim 4, wherein the step of reverting does not occur until the counter reaches a predetermined threshold.

6. The method according to claim 3, further comprising:
   storing the counter in a database.

7. The method according to claim 6, wherein the database is the registry of an operating system.

8. A method according to claim 1, further comprising:
   inhibiting the loading of other application drivers if the reboot driver determines that the state is incorrect.

9. The method according to claim 1, wherein configuration data for the backup is stored in non-volatile memory.

10. The method according to claim 1, wherein the processor is a first server in a server cluster.

11. The method according to claim 10, further comprising:
    communicating to a second sever that an upgrade is to occur in the first server; and
    confirming that second server is running a program which is compatible with the upgraded program prior to beginning the installation.

12. The method according to claim 11, wherein the second server is part of a server cluster with the first server.

13. The method according to claim 11, wherein the upgraded program is sent to the first server from a remote location.

14. The method according to claim 11, wherein the installation of the upgrade is performed automatically.

15. The method according to claim 11, wherein no user input device or viewing device is attached to the first server which is upgraded.

16. The method according to claim 10, further comprising:
    communicating to a second server that an upgrade is to occur in the first server;
    checking if the second server is running a program which is compatible with the upgraded program prior to beginning the installation;
    sending a signal to the first server to abort the upgrade if the second server is not running a compatible version of the program.

17. The method according to claim 16, further comprising:
    sending a signal prior to the first server beginning installation of the upgrade indicating that the second server will receive input and output formerly associated with the first server.

18. The method according to claim 17, further comprising:
    notifying the second server that the first server is in the process of rebooting.

19. The method according to claim 18, further comprising:
    sending a confirmation to the second server that the first server has been upgraded.

20. The method according to claim 19, further comprising:
    upgrading the second server.

21. A processor program product on a processor readable medium for use with a processor comprising:
    processor code for rebooting the processor subsequent to an upgraded version of a processor program being installed; and
    processor code for checking if the state of the processor is set correctly prior to initializing application drivers.

22. A processor program product according to claim 21, further comprising
    processor code for recalling a backup of the program from memory if the state of the processor is incorrect; and
    reinstalling the backup of the program.

23. A processor program product according to claim 21, further comprising:
    processor code for inhibiting the loading of the application drivers if the state of the processor is incorrect.

24. The processor program product according to claim 21, further comprising:
    processor code for setting a counter indicating the number of times that the processor is rebooted; and
    processor code for rebooting the processor with the upgraded version if the counter has not reached a predetermined threshold;
    wherein the processor code for recalling a backup of the program does not execute until the counter has reached the predetermined threshold.

25. The processor program product according to claim 21, further comprising:
    processor code for sending a message from the processor located in a first server to a second server when an upgrade is to occur in the first server; and
    processor code in the first server for confirming that the second server is running a program which is compatible with the upgraded program prior to beginning installation of the upgraded program.

26. The processor program product according to claim 25, wherein the second server is part of a server cluster with the first server.

27. The processor program product according to claim 26, further comprising:

processor code for sending a message for transferring control of input and output to the second server prior to the first serving beginning installation of the upgrade.

28. The processor program product according to claim 27, further comprising:

processor code for sending a confirmation to the second server that the first processor has been upgraded.

29. A digital storage medium encoded with instructions which, when loaded into a first processor performs an upgrade of a program, the digital storage medium comprising:

a receiving module for receiving the upgrade into the first processor and recognizing that the program is an upgrade of a current program which is resident on the first processor;

a copy module for initiating copying the current program and initiating storage of a backup copy of the current program in memory;

an installation module for installing the upgrade and rebooting the first processor;

a reboot driver for reading the state of the first processor prior to the initialization of application drivers;

a reversion module for recalling the backup copy of the current program and causing the installation of the backup copy if the installation of the upgrade fails.

30. A digital storage medium according to claim 29, further comprising:

a transceiver module for communicating to a second processor that an upgrade is to occur in the first processor and confirming that the second processor is running a program which is compatible with the upgraded program prior to beginning the installation.

* * * * *